US008800265B2

(12) United States Patent
Gonze et al.

(10) Patent No.: US 8,800,265 B2
(45) Date of Patent: Aug. 12, 2014

(54) EXHAUST GAS TREATMENT SYSTEM FOR AN INTERNAL COMBUSTION ENGINE

(75) Inventors: Eugene V. Gonze, Pinckney, MI (US); Scot A. Douglas, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 971 days.

(21) Appl. No.: 12/887,978

(22) Filed: Sep. 22, 2010

(65) Prior Publication Data

US 2012/0067026 A1   Mar. 22, 2012

(51) Int. Cl.
*F01N 3/025* (2006.01)

(52) U.S. Cl.
USPC .............................................. 60/277; 60/295

(58) Field of Classification Search
USPC .................... 60/276, 277, 286, 295, 297, 311
See application file for complete search history.

(56) References Cited

U.S. PATENT DOCUMENTS

| | | | |
|---|---|---|---|
| 6,823,663 | B2 | 11/2004 | Hammerle et al. |
| 6,832,473 | B2 | 12/2004 | Kupe et al. |
| 7,506,504 | B2 | 3/2009 | Kumar |
| 2010/0111774 | A1* | 5/2010 | Toshioka et al. ............. 422/105 |

FOREIGN PATENT DOCUMENTS

| | | |
|---|---|---|
| DE | 2643739 A1 | 3/1978 |
| EP | 2143900 A1 | 1/2010 |
| FR | 2919339 A1 | 1/2009 |
| JP | 2008255905 A * | 10/2008 |

OTHER PUBLICATIONS

Chinese Office Action for Application No. 201110348328.9 dated Oct. 8, 2013, 10 pages.
German Office Action for Application No. 102011113766.5 dated Mar. 5, 2013; 7 pages.

* cited by examiner

*Primary Examiner* — Kenneth Bomberg
*Assistant Examiner* — Jonathan Matthias
(74) *Attorney, Agent, or Firm* — Cantor Colburn LLP

(57) ABSTRACT

An exhaust gas treatment system for an internal combustion engine comprises an oxidation catalyst device configured to oxidize the hydrocarbon and carbon monoxide in the exhaust gas. A first temperature sensor is located downstream of the oxidation catalyst device and has a temperature probe that is in fluid communication with the exhaust gas flow exiting the oxidation catalyst device. A second temperature sensor is located downstream of the oxidation catalyst device and has a temperature probe that is in fluid communication with the exhaust gas flow exiting the oxidation catalyst device. The temperature probe includes a catalyst compound coating disposed thereon and is operable to catalyze the oxidation of CO and HC, or a combination thereof, that exits the oxidation catalyst device. A controller is in signal communication with temperature sensors and is configured to monitor signals from temperature sensors to determine if the temperature differential exceeds a predetermined threshold.

15 Claims, 2 Drawing Sheets

EXHAUST GAS TREATMENT SYSTEM FOR AN INTERNAL COMBUSTION ENGINE

FIELD OF THE INVENTION

Exemplary embodiments of the present invention relate to exhaust gas treatment systems for internal combustion engines and, more particularly, to a system for monitoring the conversion efficiency of an oxidation catalyst.

BACKGROUND

The exhaust gas emitted from an internal combustion engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter. Catalyst compositions, typically disposed on catalyst supports or substrates that are disposed within the exhaust system of an internal combustion engine are provided to convert certain or all of these exhaust gas constituents into non-regulated exhaust gas components. For example, exhaust systems for internal combustion engines may include one or more of a precious metal containing oxidation catalyst ("OC") for the reduction of CO and excess HC, a selective catalyst reduction catalyst ("SCR") for the reduction of $NO_x$ and a particulate filter device ("PF") for the removal of particulate matter.

An exhaust gas treatment technology in use for high levels of particulate matter reduction, the PF may utilize one of several known exhaust gas filter structures that have displayed effectiveness in removing the particulate matter from the exhaust gas. Such exhaust gas filter structures may include, but are not limited to ceramic honeycomb wall flow filters, wound or packed fiber filters, open cell foams, sintered metal fibers, etc. Ceramic wall flow filters have experienced significant acceptance in automotive applications.

The exhaust gas filter is a physical structure for removing particulates from exhaust gas and, as a result, the accumulation of filtered particulates in the exhaust gas filter will have the effect of increasing backpressure in the exhaust system that is experienced by, and that must be overcome by, the internal combustion engine. To address backpressure increases caused by the accumulation of exhaust gas particulates in the exhaust gas filter, the PF is periodically cleaned, or regenerated. Regeneration of a PF in vehicle applications is typically automatic and is controlled by an engine or other suitable controller based on signals generated by engine and exhaust system sensors. The regeneration event involves increasing the temperature of the PF filter, typically by heating the engine exhaust gas, to levels that are often above 600° C. in order to burn the accumulates particulates.

One method of generating the exhaust gas temperatures required in the exhaust system for regeneration of the PF is to deliver unburned HC (ex. Fuel) to an oxidation catalyst device disposed upstream of the PF or to an oxidation catalyst compound disposed in the PF itself. The HC may be delivered to the exhaust system by direct fuel injection into the exhaust system or may be achieved by "over-fueling of" or "late injection of fuel to" the internal combustion engine. The result is unburned HC mixed with the exhaust gas flowing through the exhaust system that is subject to oxidation by the oxidation catalyst in an exothermic reaction that raises the temperature of the exhaust gas. The heated exhaust gas burns the particulate accumulation in the PF. The addition of an oxidation catalyst to the PF can assist in lowering the oxidation temperature of soot and particulates and thus the regeneration temperatures required. This can result in increased durability of the PF and lower HC requirements for regeneration and, therefore, improved fuel economy for the internal combustion engine. In addition, such an oxidation catalyst applied to the PF is useful to oxidize any remaining excess HC in the exhaust gas as well as reducing carbon monoxide constituents ("CO") resulting from the combustion of soot and particulates.

Increasingly stringent regulations directed to the operation of internal combustion engines, particularly those used in vehicular applications, require monitoring and functional diagnosis of oxidation catalysts disposed in the exhaust gas treatment system including the PF catalyst.

SUMMARY OF THE INVENTION

In an exemplary embodiment of the present invention, an exhaust gas treatment system for an internal combustion engine comprises an exhaust gas conduit in fluid communication with, and configured to receive an exhaust gas from, the internal combustion engine and to conduct the exhaust gas between a plurality of devices of the exhaust gas treatment system. An oxidation catalyst device is disposed in fluid communication with the exhaust gas conduit and is configured to oxidize hydrocarbon and carbon monoxide in the exhaust gas. A first temperature sensor is located downstream of the oxidation catalyst device and has a temperature probe that is in fluid communication with the exhaust gas flow exiting the oxidation catalyst device. A second temperature sensor is located downstream of the oxidation catalyst device and has a temperature probe that is in fluid communication with the exhaust gas flow exiting the oxidation catalyst device; the temperature probe including a catalyst compound coating disposed thereon and operable to catalyze the oxidation of CO and HC, or a combination thereof, that exits the oxidation catalyst device. A controller in signal communication with the first and the second temperature sensors is configured to monitor signals from the first and second temperature sensors to determine if the temperature differential exceeds a predetermined threshold.

In another exemplary embodiment of the present invention, an exhaust gas treatment system for an internal combustion engine comprises an exhaust gas conduit in fluid communication with, and configured to receive an exhaust gas from, the internal combustion engine and to conduct the exhaust gas between a plurality of exhaust treatment devices of the exhaust gas treatment system. A hydrocarbon source is connected to the exhaust gas conduit and is in fluid communication with the exhaust gas for delivery of hydrocarbon thereto. An oxidation catalyst device is disposed in fluid communication with the exhaust gas conduit and is configured to oxidize the exhaust gas and hydrocarbon to raise the temperature of the exhaust gas. An exhaust gas filter assembly having an exhaust gas filter for collection of carbon and particulates entrained therein, is in fluid communication with the exhaust gas conduit and is located downstream of the oxidation catalyst device for receipt of the exhaust gas and combustion of carbon and particulates collected in the exhaust gas filter. A second oxidation catalyst compound is associated with the particulate filter device and a first temperature sensor is located downstream of the exhaust gas filter assembly and the second oxidation catalyst compound and comprises a temperature probe that is in fluid communication with the exhaust gas flow exiting the exhaust gas filter assembly. A second temperature sensor is located downstream of the exhaust gas filter assembly and the second oxidation catalyst compound and includes a temperature probe that is in fluid communication with the exhaust gas flow exiting the exhaust gas filter assembly. The temperature probe of the second temperature sensor comprises a catalyst compound coating disposed thereon that is operable to catalyze the oxidation of CO and HC, or a combination thereof, that exits the exhaust gas filter assembly. A controller is in signal communication with the first and the second temperature sensors and is configured to monitor signals from the first and second temperature sensors and determine if the temperature differential exceeds a predetermined threshold.

In yet another exemplary embodiment of the present invention, a method for monitoring the performance of an exhaust gas treatment system comprising an exhaust gas conduit in fluid communication with, and configured to receive an exhaust gas from an internal combustion engine and to conduct the exhaust gas between a plurality of devices of the exhaust gas treatment system, an oxidation catalyst device disposed in fluid communication with the exhaust gas conduit and configured to oxidize the hydrocarbon and carbon monoxide in the exhaust gas, a first temperature sensor located downstream of the oxidation catalyst device having a temperature probe that is in fluid communication with the exhaust gas flow exiting the oxidation catalyst device, a second temperature sensor located downstream of the oxidation catalyst device having a temperature probe that is in fluid communication with the exhaust gas flow exiting the oxidation catalyst device, the temperature probe including a catalyst compound coating disposed thereon and operable to catalyze the oxidation of CO and HC, or a combination thereof, that exits the oxidation catalyst device and a controller in signal communication with the first and the second temperature sensors and configured to monitor signals from the first and second temperature sensors comprises monitoring signals from the first and second temperature sensors to determine if the temperature differential exceeds a predetermined threshold.

The above features and advantages and other features and advantages of the present invention are readily apparent from the following detailed description of the invention when taken in connection with the accompanying drawing.

BRIEF DESCRIPTION OF THE DRAWING

Other features, advantages and details appear, by way of example only, in the following detailed description of the embodiments, the detailed description referring to the drawing in which.

DESCRIPTION OF THE EMBODIMENTS

Figure 1:
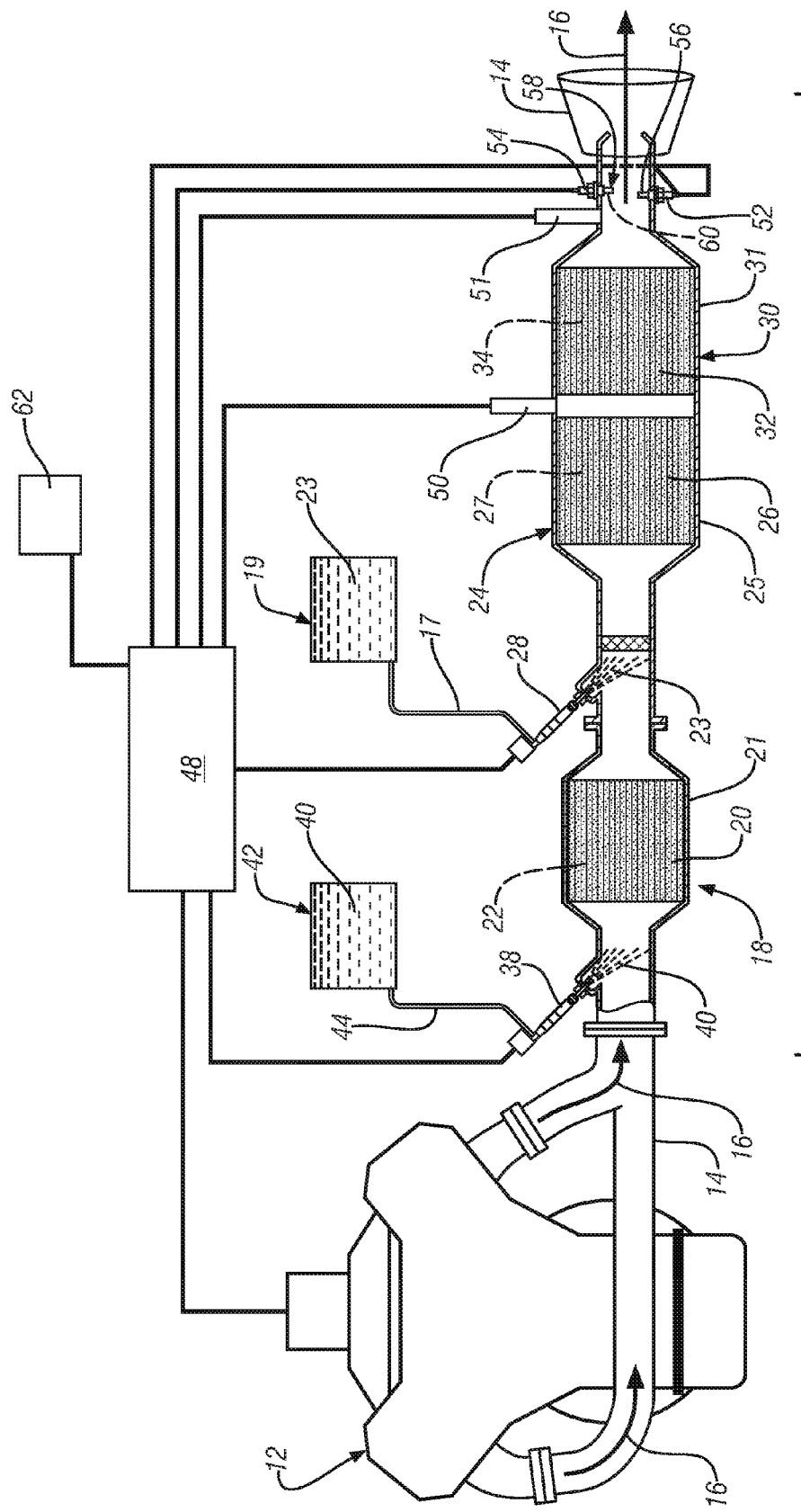
FIG. 1 is a schematic view of an exhaust gas treatment system for an internal combustion engine embodying features of the invention.

The following description is merely exemplary in nature and is not intended to limit the present disclosure, its application or uses.

Referring to the Figure, an exemplary embodiment of the invention is directed to an exhaust gas treatment system 10, for the reduction of regulated exhaust gas constituents emitted by an internal combustion engine 12. It is appreciated that the invention described herein can and may be implemented in various engine systems implementing an exhaust gas particulate filter. Such internal combustion engine systems may include, but are not limited to, diesel systems, gasoline systems and various homogeneous charge compression ignition engine systems.

The exhaust treatment system 10 includes an exhaust gas conduit 14, which may comprise several segments that function to transport exhaust gas 16 from the engine 12 to the various exhaust treatment devices of the exhaust treatment system 10. The exhaust treatment devices may include an oxidation catalyst device ("OC") 18. The OC 18 may be constructed with a flow-through metal or ceramic monolith substrate 20 that is packaged in a rigid shell or canister 21 having an inlet and an outlet in fluid communication with the exhaust gas conduit 14. The substrate 20 has an oxidation catalyst compound 22 disposed thereon. The oxidation catalyst compound 22 may be applied as a wash coat and my contain platinum group metals such as platinum ("Pt"), palladium ("Pd"), rhodium ("Rh") or other suitable oxidizing catalysts, or combination thereof. The OC 18 is useful in treating unburned gaseous and non-volatile HC and CO, which are oxidized, in an exothermic reaction, to form carbon dioxide and water.

In an exemplary embodiment, a selective catalytic reduction device ("SCR") 24 may be disposed downstream of the OC 18. In a manner similar to the OC, the SCR device 24 may also be constructed with a flow-through ceramic or metal monolith substrate 26 that is packaged in a rigid shell or canister 25 having an inlet and an outlet in fluid communication with the exhaust gas conduit 14. The substrate 26 has a NOx reducing catalyst composition such as an SCR catalyst composition 27 applied thereto. The SCR catalyst composition preferably contains a zeolite and one or more base metal components such as iron ("Fe"), cobalt ("Co"), copper ("Cu") or vanadium ("V") that can operate efficiently to convert $NO_x$ constituents in the exhaust gas 16 in the presence of a reductant such as ammonia ("$NH_3$"). The $NH_3$ reductant 23, supplied from reductant supply tank 19 through reductant conduit 17, is injected into the exhaust gas conduit 14 at a location upstream of the SCR device 24 using delivery device such as a reductant injector 28 that is in fluid communication with conduit 14, or other suitable method of delivery of the reductant 23 to the exhaust gas 16. The $NH_3$ reductant 23 may be in the form of a gas, a liquid or an aqueous urea solution and may be mixed with air in the reductant injector 28 to aid in the dispersion of the injected spray in the exhaust gas 16.

In an exemplary embodiment, an exhaust gas filter assembly ("PF") 30 is located within the exhaust gas treatment system 10, downstream of the OC device 18 and the SCR device 24. The PF 30 operates to filter the exhaust gas 16 of carbon and other exhaust born particulates. The PF device 30 shown is constructed using a ceramic wall flow monolith exhaust gas filter ("exhaust gas filter") 32 that is packaged in a rigid, heat resistant shell or canister 31, having an inlet and an outlet in fluid communication with exhaust gas conduit 14. Exhaust gas 16 entering the exhaust gas filter 32 is forced to migrate through porous, adjacently extending walls and it is through this mechanical filtration mechanism that the exhaust gas is filtered of carbon and other particulates. The filtered particulates are entrained within the exhaust gas filter 32 and, over time, will have the effect of increasing the exhaust gas backpressure experienced by the engine 12. It is appreciated that the ceramic wall flow monolith exhaust gas filter 32 is merely exemplary in nature and that the PF 30 may include other filter devices such as wound or packed fiber filters, open cell foams, sintered metal fibers, etc.

Figure 2:
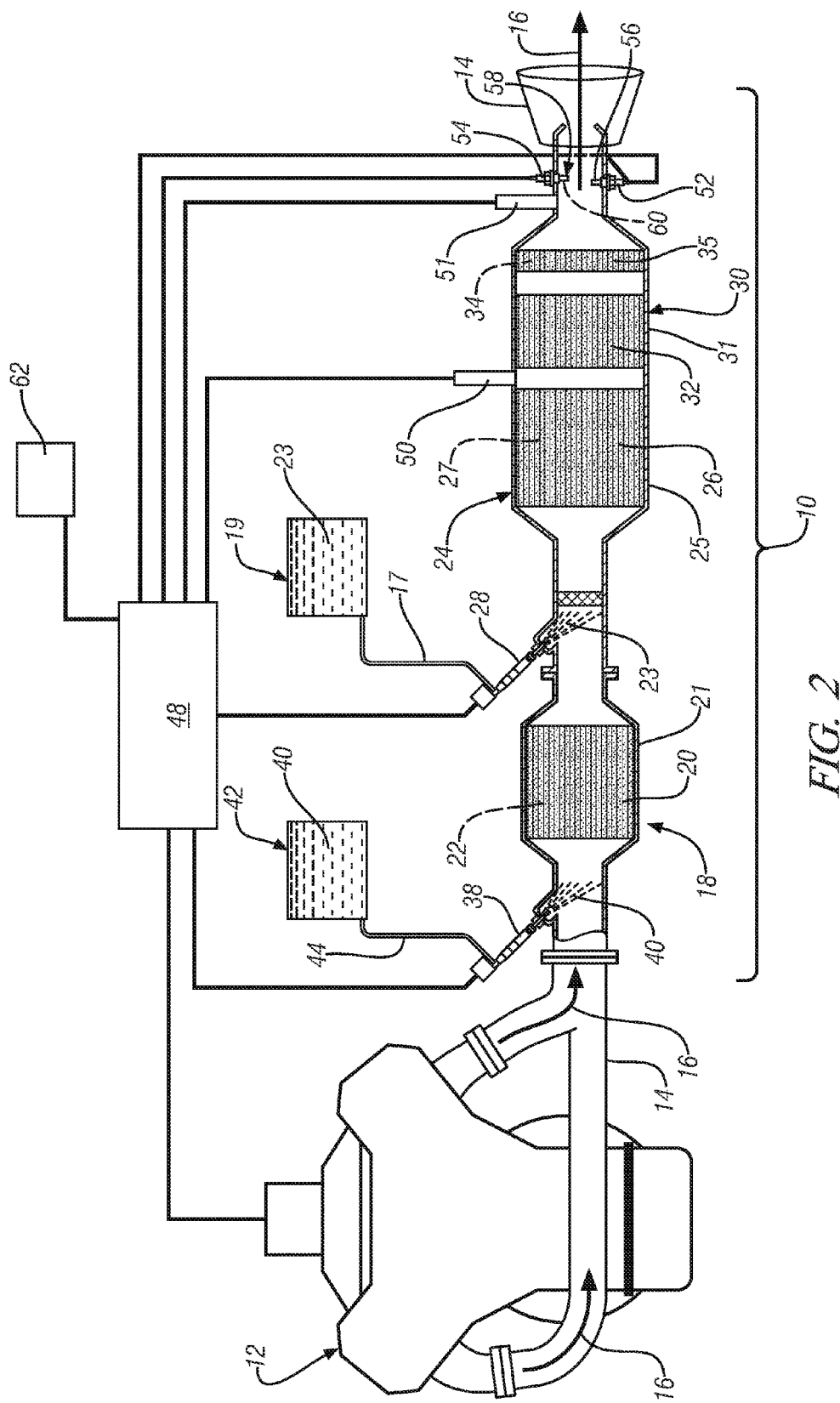
FIG. 2 is a schematic view of another embodiment of an exhaust gas treatment system for an internal combustion engine embodying features of the invention.

In an exemplary embodiment, the increase in exhaust gas backpressure caused by the entrainment or accumulation of particulate matter in the exhaust gas filter 32 requires that the PF device 30 be periodically cleaned, or regenerated. Regeneration involves the oxidation or burning of the accumulated carbon and other particulates in what is typically a high temperature (>600° C.) environment. For regeneration purposes, a second oxidation catalyst compound 34 may be disposed on the exhaust gas filter 32 or on a separate substrate downstream of the PF device 30. The oxidation catalyst compound 34 may be located on an individual flow-through ceramic or metal monolith substrate 35, FIG. 2, or, in the embodiment shown in the FIG. 1, may be located within the canister 31 and on the exhaust gas filter 32. Disposition of the second oxidation catalyst compound 34 on the exhaust gas filter 32, rather than in a separate, downstream oxidation catalyst device is effective in lowering the oxidation temperature of the soot and particulates to temperatures in the range of about 350° C. rather than >600° C. This improves the durability of the PF device 30 and reduces the HC required to regenerate the exhaust gas filter 32. The second oxidation catalyst compound 34 may be applied as a wash coat and may contain platinum group metals such as platinum ("Pt"), palladium ("Pd"), rhodium ("Rh") or other suitable oxidizing catalysts, or combinations thereof.

Disposed upstream of PF device 30, in fluid communication with the exhaust gas 16 in the exhaust gas conduit 14, is an HC delivery device such as fuel injector 38. The fuel injector 38, in fluid communication with fuel supply 40 in fuel supply tank 42 through fluid conduit 44, is configured to introduce unburned fuel (i.e. HC) 40 into the exhaust gas stream 16. A controller such as vehicle, engine or powertrain controller 48 is operably connected to, and monitors, the exhaust gas treatment system 10 through signal communication with a number of sensors. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality. In another embodiment, the fuel injector 38 may be substituted and replaced by control of the fueling of internal combustion engine 12. In such a case, determination by the controller 48 that fuel is required to be injected into the exhaust gas treatment system 10, as described herein, the internal combustion engine 12 may be commanded to provide additional fuel; referred to as "over-fueling" or "late fueling" of the engine cylinders in order to release fuel into the exhaust gas 16 through the exhaust gas conduit 14.

In an exemplary embodiment, backpressure sensors 50 and 51, located upstream and downstream of PF device 30, generate signals (ex. pressure differential "ΔP") indicative of the carbon and particulate loading in the exhaust gas filter 32. Upon a determination that the pressure differential, or pressure drop, across the PF device 30 has reached a predetermined level that is indicative of the need to clean or regenerate the exhaust gas filter 32 of the PF device 30, the controller 48 activates the fuel injector 38, or commands the internal combustion engine 12 to supply fuel 40 to the exhaust gas 16. In an exemplary embodiment, the OC 18 is oxidizes the injected fuel 40 resulting in an increase in the temperature of the exhaust gas 16 to a temperature that is sufficient to initiate combustion of the soot and particulates in the PF device 30 (i.e. within a range of about 350° C. to over 600° C. depending upon the location of the second oxidation catalyst compound 34 (i.e. on the exhaust gas filter 32 or downstream thereof)).

In an exemplary embodiment, regardless of the location of the second oxidation catalyst compound 34, it is desirable to monitor its performance with respect to its ability to convert or reduce the regulated exhaust gas constituents CO (from the combustion of particulates and soot) and HC. Located downstream of the PF device 30 and the second oxidation catalyst compound 34 are first and second temperature sensors 52 and 54. The first and second temperature sensors 52 and 54 are in signal communication with controller 48 and are configured to communicate information to the controller that is representative of the temperature of the exhaust gas 16 downstream of both the PF device 30 and the second oxidation catalyst 34.

The first temperature sensor 52 comprises a temperature probe 56 that is in fluid communication with the exhaust gas flow 16 exiting the PF device 30. The second temperature sensor 54 also comprises a temperature probe 58 that is in fluid communication with the exhaust gas flow 16 exiting the PF device 30. The temperature probe 58 of the second temperature sensor 54 includes a catalyst compound coating 60 such as an oxidation catalyst compound that may comprise a wash coat and may contain platinum group metals selected from the group of platinum ("Pt"), palladium ("Pd"), rhodium ("Rh") or other suitable oxidizing catalysts, or a combination thereof. In an exemplary embodiment, the catalyst compound coating 60 disposed on the temperature probe 58 of the second temperature sensor 54 is operable to catalyze the oxidation of CO and HC, or a combination thereof that exits the PF device 30 and the second oxidation catalyst compound 34. As a result of such oxidation, in the presence of excess CO and/or HC in the exhaust gas flow 16, the temperature of the temperature probe 58 of the second temperature sensor 54 will be elevated above that of the temperature probe 56 of the first temperature sensor 52. The difference in temperatures of the two probes 58 and 56 indicate that the second oxidation catalyst compound 34 on or adjacent to the PF device 30 may be functioning at less than optimal efficiency. The controller 48 monitors the signals from the first and the second temperature sensors 52, 54 respectively. Upon receipt of two separate and unequal signals controller 48 will determine if the temperature differential is above a predetermined threshold (ex. as high as +/−7° F.) and, if so, may alert the operator of the internal combustion engine 12 that service is necessary. Such notification may occur through the setting of an error code in the controller 48, through the illumination of a service lamp 62, other signaling device or a combination thereof.

While the invention has been described above with respect to its application to the performance of an oxidation catalyst related to a particulate filter in the exhaust system of an internal combustion engine, it is, of course, contemplated that such a system will have application to the monitoring of any catalyst device in which the oxidation of an exhaust gas constituent such as CO or HC is required. This invention has application to both gasoline and to diesel internal combustion engines to the extent that excess oxygen is available downstream of the oxidation catalyst compound to promote oxidation on the second temperature sensor probe (i.e. the probe having the catalyst compound disposed thereon).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system for an internal combustion engine comprising:
   an exhaust gas conduit in fluid communication with, and configured to receive an exhaust gas from, the internal combustion engine and to conduct the exhaust gas between a plurality of devices of the exhaust gas treatment system;
   a hydrocarbon source in fluid communication with the exhaust gas conduit to deliver hydrocarbon to the exhaust gas;
   an oxidation catalyst device disposed in fluid communication with the exhaust gas conduit and configured to oxidize hydrocarbon and carbon monoxide in the exhaust gas;
   a reductant injector in fluid communication with the exhaust gas conduit downstream of the first oxidation catalyst device to deliver a reductant to the exhaust gas;
   a selective catalytic reduction (SCR) device disposed in fluid communication with the exhaust gas conduit downstream of the reductant injector;
   a first pressure sensor disposed in fluid communication with the exhaust gas conduit downstream of the SCR device;
   an exhaust gas filter assembly having an exhaust gas filter having an oxidation catalyst compound disposed thereon for collection of carbon and particulates entrained therein, in fluid communication with the exhaust gas conduit and located downstream of the first pressure sensor for receipt of the exhaust gas and combustion of carbon and particulates collected in the exhaust gas filter;
   a second pressure sensor disposed in fluid communication with the exhaust gas conduit downstream of the exhaust gas filter;
   a first temperature sensor located downstream of the second pressure sensor and having a temperature probe that is in fluid communication with the exhaust gas flow exiting the oxidation catalyst device;
   a second temperature sensor located downstream of the second pressure sensor and having a temperature probe that is in fluid communication with the exhaust gas flow exiting the oxidation catalyst device, the second temperature sensor temperature probe including a catalyst compound coating disposed thereon and operable to catalyze the oxidation of CO and HC, or a combination thereof, that exits the oxidation catalyst device; and
   a controller in signal communication with the first and second pressure sensors and the first and the second temperature sensors, the controller configured to monitor signals from the first and second pressure sensors to determine if a pressure differential across the exhaust gas filter has reached a predetermined level that is indicative of the need to regenerate the exhaust gas filter, the controller further configured to monitor signals from the first and second temperature sensors if the exhaust gas filter is being regenerated and determine if a temperature differential exceeds a predetermined threshold.

2. The exhaust gas treatment system of claim 1, wherein the controller is configured to notify the operator of the internal combustion engine if the temperature differential exceeds a predetermined threshold.

3. The exhaust gas treatment system of claim 2, wherein the notification may occur through the setting of an error code in the controller, through the illumination of a service lamp or a combination thereof.

4. The exhaust gas treatment system of claim 1, wherein the catalyst compound disposed on the temperature probe of the second temperature sensor comprises a wash coat containing platinum group metals selected from the group of platinum ("Pt"), palladium ("Pd"), rhodium ("Rh"), or a combination thereof.

5. The exhaust gas treatment system of claim 1, wherein the oxidation catalyst device is packaged in a first canister, and the SCR device and the combined oxidation catalyst compound and exhaust gas filter are packaged in a second canister.

6. An exhaust gas treatment system for an internal combustion engine comprising:
   an exhaust gas conduit in fluid communication with, and configured to receive an exhaust gas from, the internal combustion engine and to conduct the exhaust gas between a plurality of exhaust treatment devices of the exhaust gas treatment system;
   a hydrocarbon source in fluid communication with the exhaust gas conduit to deliver hydrocarbon to the exhaust gas;
   a first oxidation catalyst device disposed in fluid communication with the exhaust gas conduit and configured to oxidize the exhaust gas and hydrocarbon to raise the temperature of the exhaust gas;
   a reductant injector in fluid communication with the exhaust gas conduit downstream of the first oxidation catalyst device to deliver a reductant to the exhaust gas;
   a selective catalytic reduction (SCR) device disposed in fluid communication with the exhaust gas conduit downstream of the reductant injector;
   a first pressure sensor disposed in fluid communication with the exhaust gas conduit downstream of the SCR device;
   an exhaust gas filter assembly having an exhaust gas filter for collection of carbon and particulates entrained therein, in fluid communication with the exhaust gas conduit and located downstream of the first pressure sensor for receipt of the exhaust gas and combustion of carbon and particulates collected in the exhaust gas filter;
   a second oxidation catalyst device disposed in fluid communication with the exhaust gas conduit downstream of the exhaust gas filter;
   a second pressure sensor disposed in fluid communication with the exhaust gas conduit downstream of the second oxidation catalyst device;
   a first temperature sensor located downstream of the second pressure sensor and comprising a temperature probe that is in fluid communication with the exhaust gas flow exiting the exhaust gas filter assembly;
   a second temperature sensor located downstream of the second pressure sensor and comprising a temperature probe that is in fluid communication with the exhaust gas flow exiting the exhaust gas filter assembly, the second temperature sensor temperature probe including a catalyst compound coating disposed thereon and operable to catalyze the oxidation of CO and HC, or a combination thereof, that exits the exhaust gas filter assembly; and
   a controller in signal communication with the first and second pressure sensors and the first and the second temperature sensors, the controller configured to monitor signals from the first and second pressure sensors to determine if a pressure differential across the exhaust gas filter has reached a predetermined level that is indicative of the need to regenerate the exhaust gas filter, the controller further configured to monitor signals from the first and second temperature sensors if the exhaust gas filter is being regenerated and determine if the temperature differential exceeds a predetermined threshold.

7. The exhaust gas treatment system of claim 1, wherein the hydrocarbon source comprises a fuel injector configured to introduce unburned fuel into the exhaust gas stream.

8. The exhaust gas treatment system of claim 1, wherein the hydrocarbon source comprises additional fuel from the internal combustion engine released into the exhaust gas as commanded by the controller.

9. The exhaust gas treatment system of claim 1, wherein the controller is configured to notify the operator of the internal combustion engine if the temperature differential exceeds a predetermined threshold.

10. The exhaust gas treatment system of claim 9, wherein the notification may occur through the setting of an error code in the controller, through the illumination of a service lamp or a combination thereof.

11. The exhaust gas treatment system of claim 1, wherein the second oxidation catalyst compound is located downstream of the exhaust gas filter assembly.

12. The exhaust gas treatment system of claim 1, wherein the catalyst compound disposed on the temperature probe of the second temperature sensor comprises a wash coat containing platinum group metals such as platinum ("Pt"), palladium ("Pd"), rhodium ("Rh"), or a combination thereof.

13. The exhaust gas treatment system of claim 1, wherein the first oxidation catalyst device is packaged in a first canister, and the SCR device, the second oxidation catalyst device, and the exhaust gas filter are packaged in a second canister.

14. A method for monitoring the performance of an exhaust gas treatment system comprising:
providing an exhaust gas conduit in fluid communication with, and configured to receive an exhaust gas from an internal combustion engine and to conduct the exhaust gas between a plurality of devices of the exhaust gas treatment system;
providing an exhaust gas filter for collection of carbon and particulates disposed in fluid communication with the exhaust gas conduit;
providing an oxidation catalyst device disposed in fluid communication with the exhaust gas conduit downstream of the exhaust gas filter and configured to oxidize the hydrocarbon and carbon monoxide in the exhaust gas;
providing a first temperature sensor located downstream of the oxidation catalyst device having a temperature probe that is in fluid communication with the exhaust gas flow exiting the oxidation catalyst device;
providing a second temperature sensor located downstream of the oxidation catalyst device having a temperature probe that is in fluid communication with the exhaust gas flow exiting the oxidation catalyst device, the second temperature sensor temperature probe including a catalyst compound coating disposed thereon and operable to catalyze the oxidation of CO and HC, or a combination thereof, that exits the oxidation catalyst device;
providing a controller in signal communication with the first and the second temperature sensors and configured to monitor signals from the first and second temperature sensors;
performing a regeneration of the exhaust gas filter;
monitoring, during the regeneration of the exhaust gas filter, signals from the first and second temperature sensors; and
determining if a temperature differential exceeds a predetermined threshold.

15. The method for monitoring the performance of an exhaust gas treatment system of claim 14 further comprising notifying the operator of the internal combustion engine if the temperature differential exceeds a predetermined threshold.

* * * * *